United States Patent

[11] 3,614,022

| [72] | Inventor | Elmer C. Henriksen<br>Chicago, Ill. |
|---|---|---|
| [21] | Appl. No. | 706,239 |
| [22] | Filed | Feb. 19, 1968 |
| [45] | Patented | Oct. 19, 1971 |
| [73] | Assignee | Bell & Howell Company<br>Chicago, Ill.<br>Continuation of application Ser. No.<br>439,210, Mar. 12, 1965, now abandoned. |

[54] PROJECTOR FOR AUTOMATICALLY THREADING, REWINDING, AND INDEXING A PLURALITY OF FILM SPOOLS AND A MAGAZINE
16 Claims, 13 Drawing Figs.

[52] U.S. Cl. .................................................. 242/198,
352/123
[51] Int. Cl. ..................................................... G03b 1/04,
G11b 15/32, G11b 23/04
[50] Field of Search .......................................... 242/197–200;
352/123, 124

[56] References Cited
UNITED STATES PATENTS

| 2,260,530 | 10/1941 | Ludwig ....................... | 95/75 |
| 2,256,739 | 9/1941 | Graves ....................... | 352/123 |
| 2,561,503 | 7/1951 | D'Ornellas ................. | 352/123 |
| 2,755,030 | 7/1956 | D'Ornellas ................. | 242/199 |
| 3,342,541 | 9/1967 | Moussie et al. ............ | 352/123 |

Primary Examiner—Leonard D. Christian
Attorneys—William F. Pinsak and John E. Peele, Jr.

ABSTRACT: A magazine having a plurality of adjoining reel compartments supplies film from successive reels in a film path for forward projection and receives film returned from the path during reverse projection and rewind following forward projection according to the condition of means for moving film between the magazine and a takeup member. During projector threading and rewind, the film path is enlarged and a shuttle for moving film intermittently during projection is prevented from film engagement. Sensing means at the film path condition the projector for (1) forward projection following threading, (2) rewinding following forward projection, and (3) terminating rewinding.

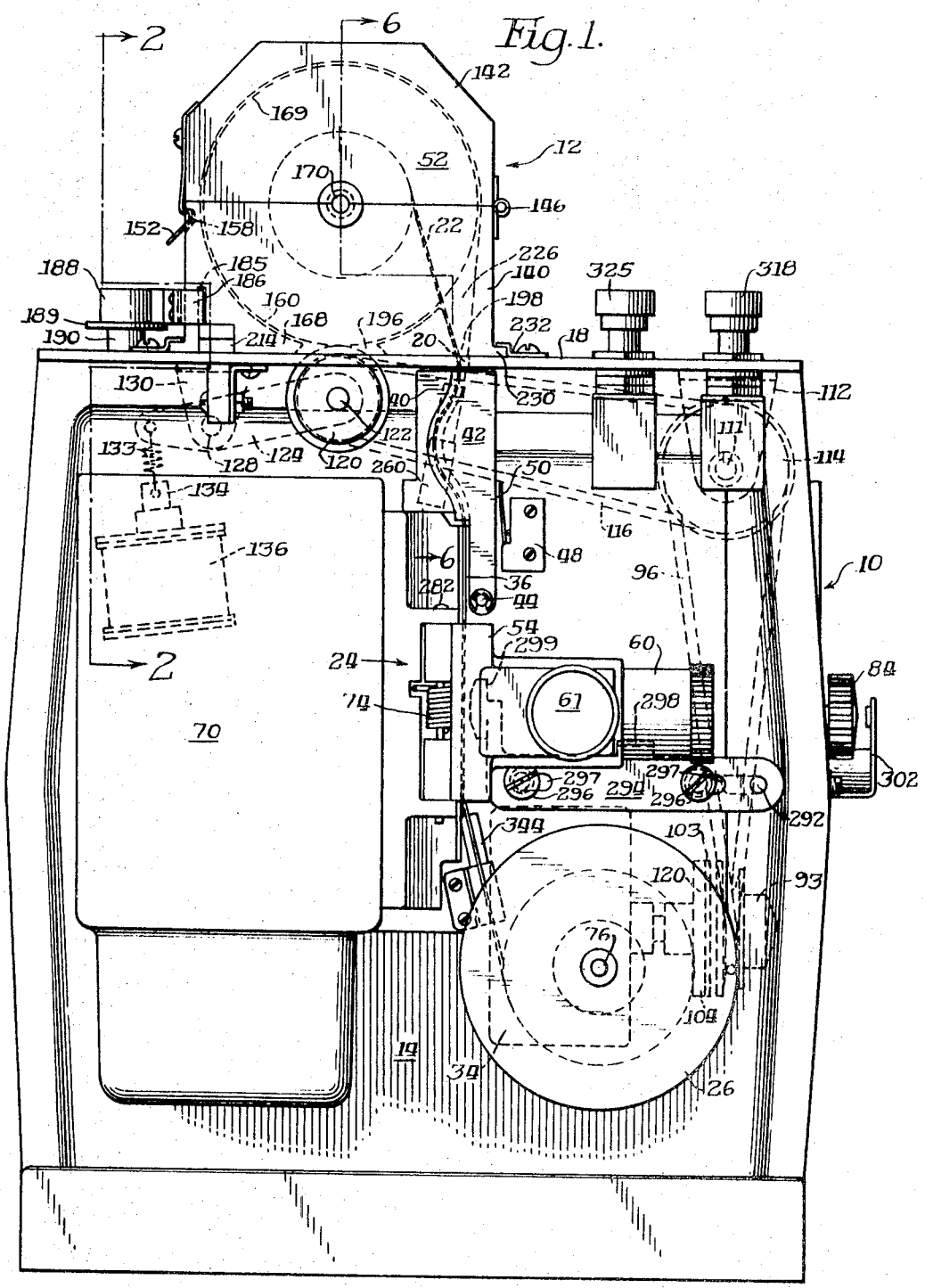

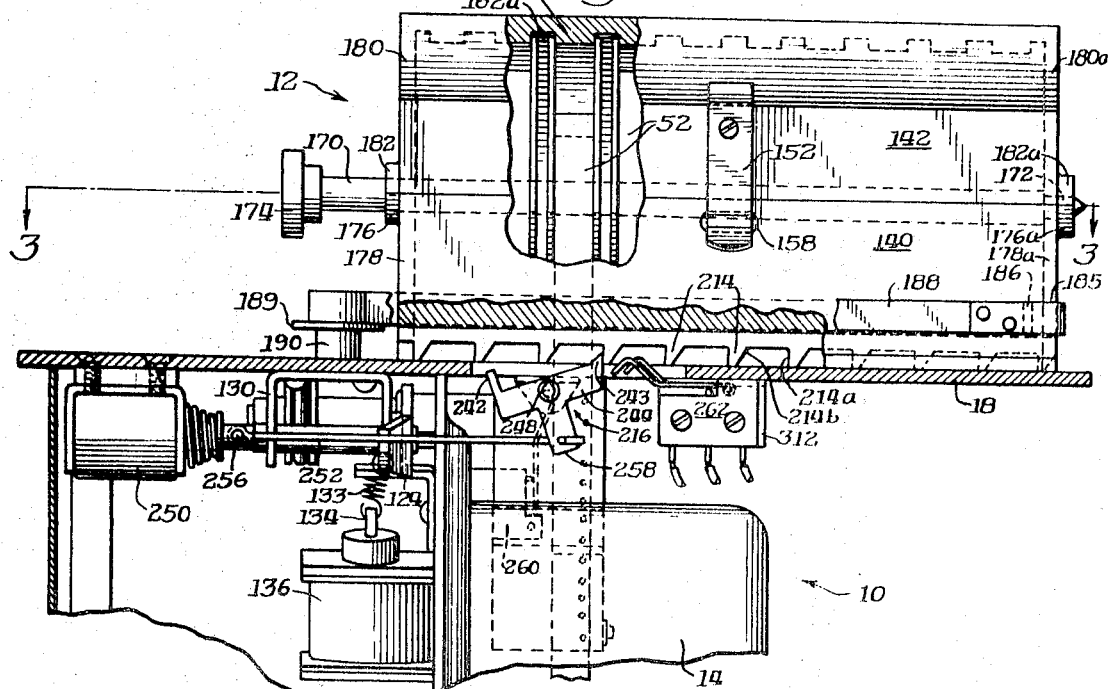
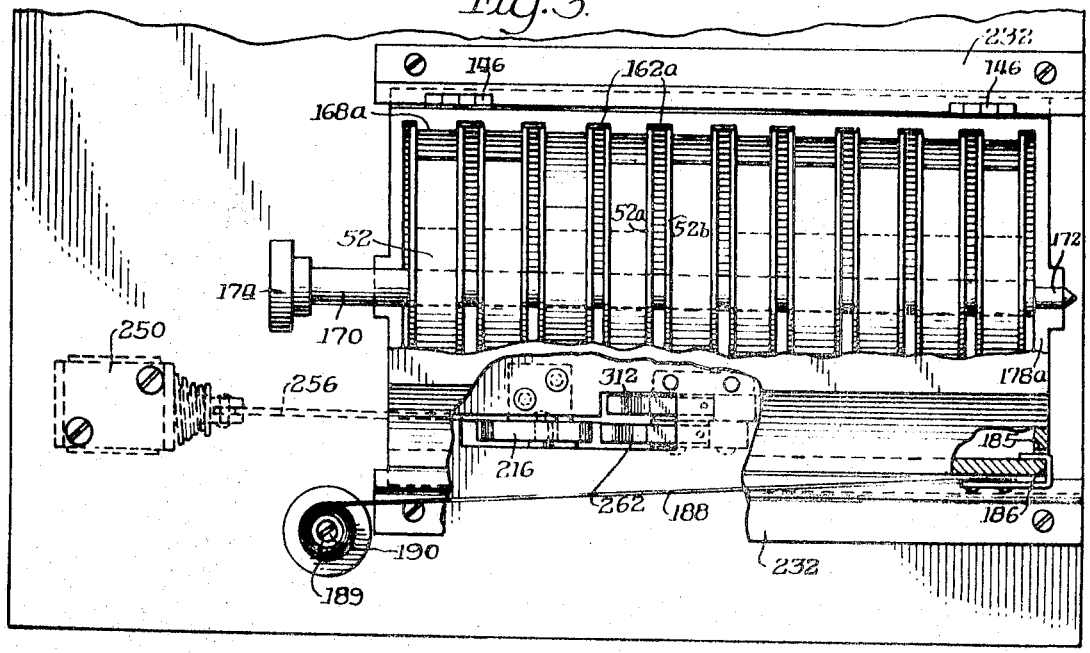
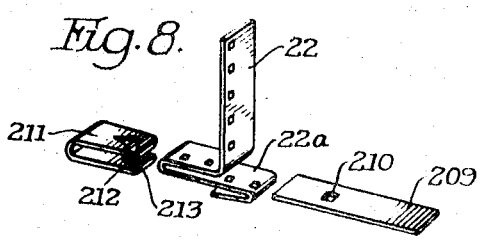

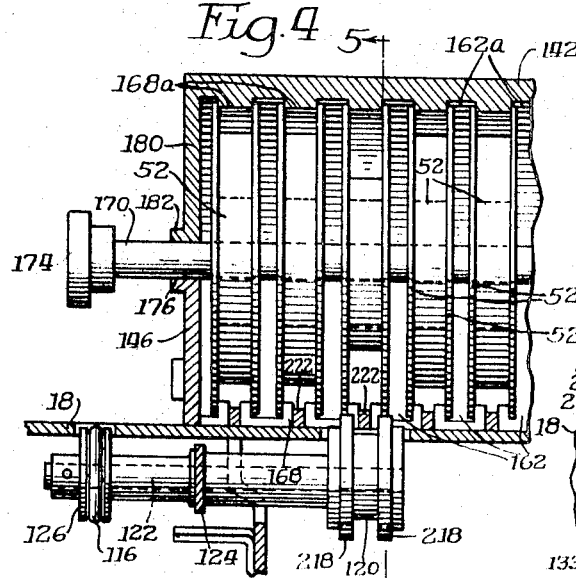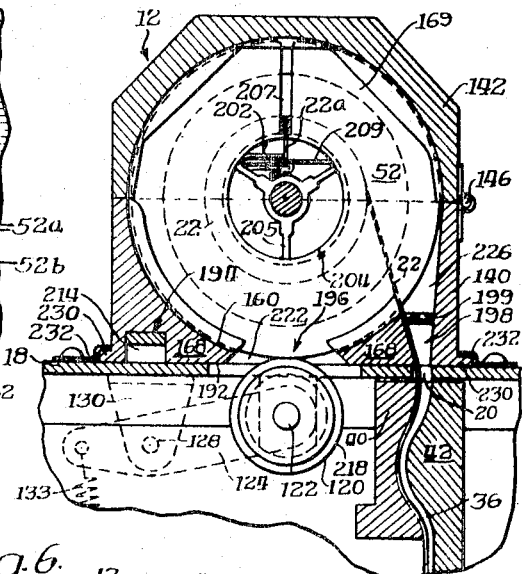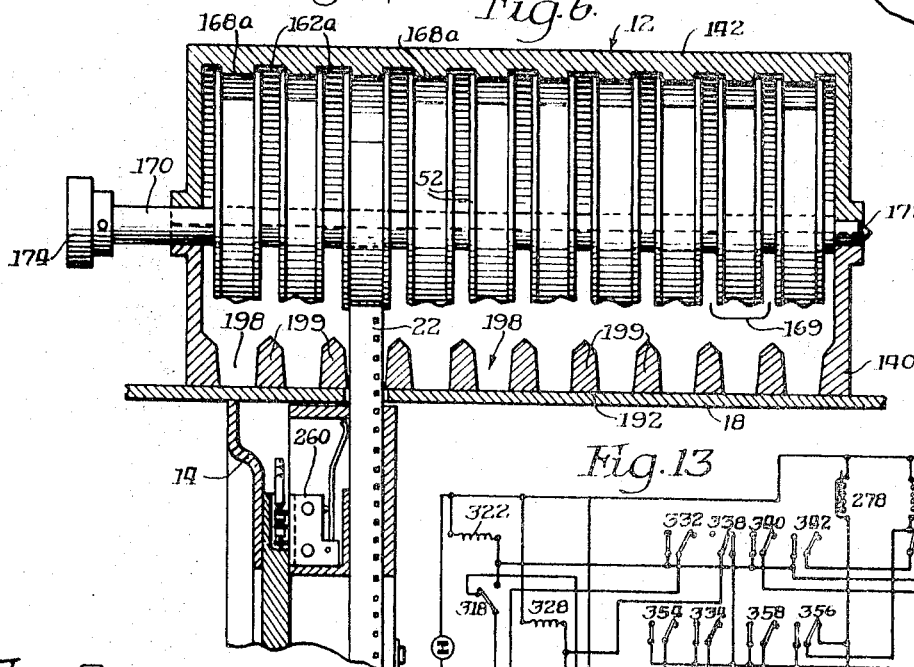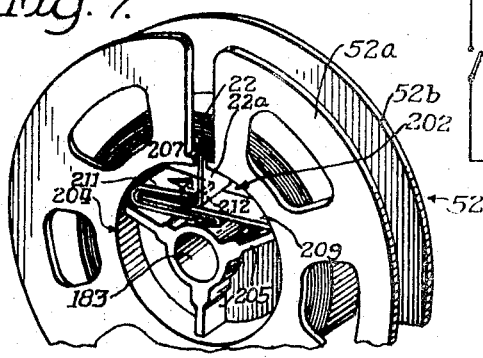

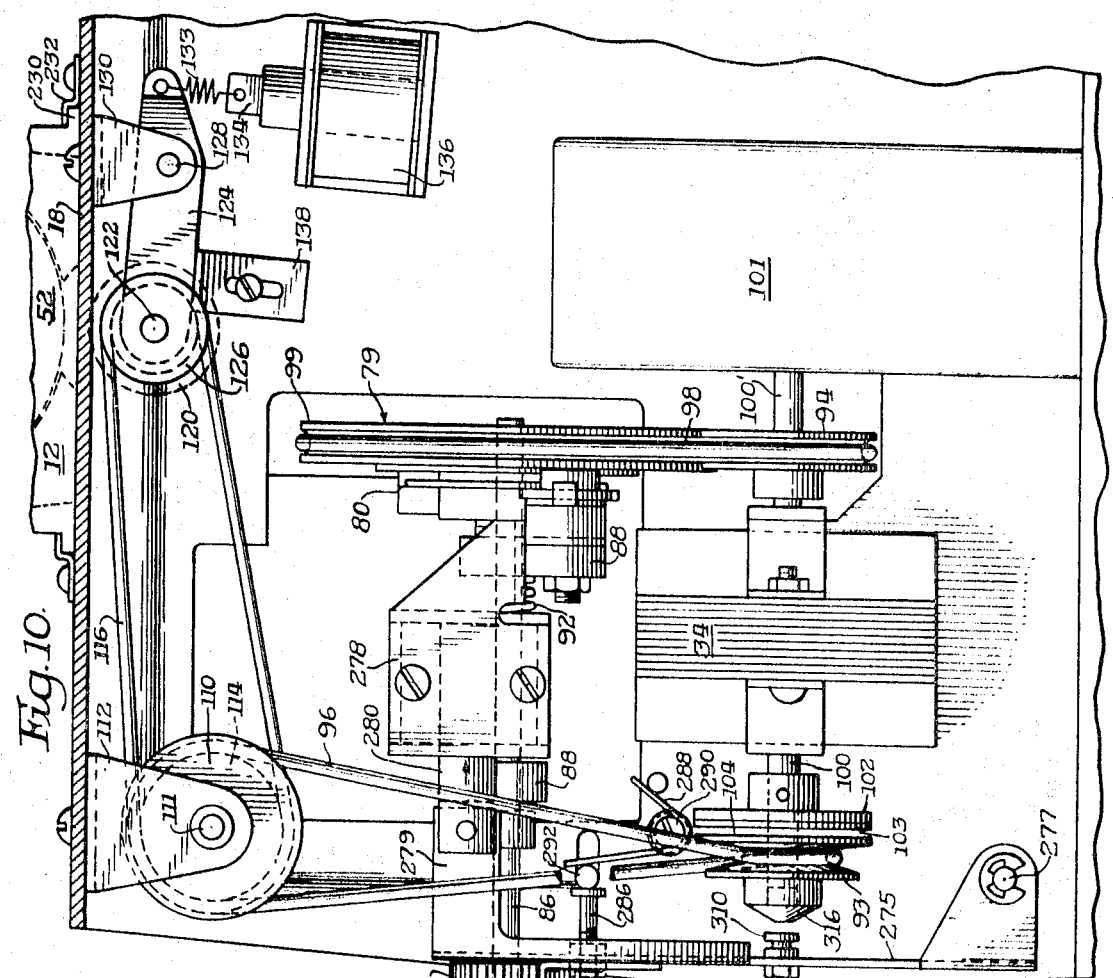
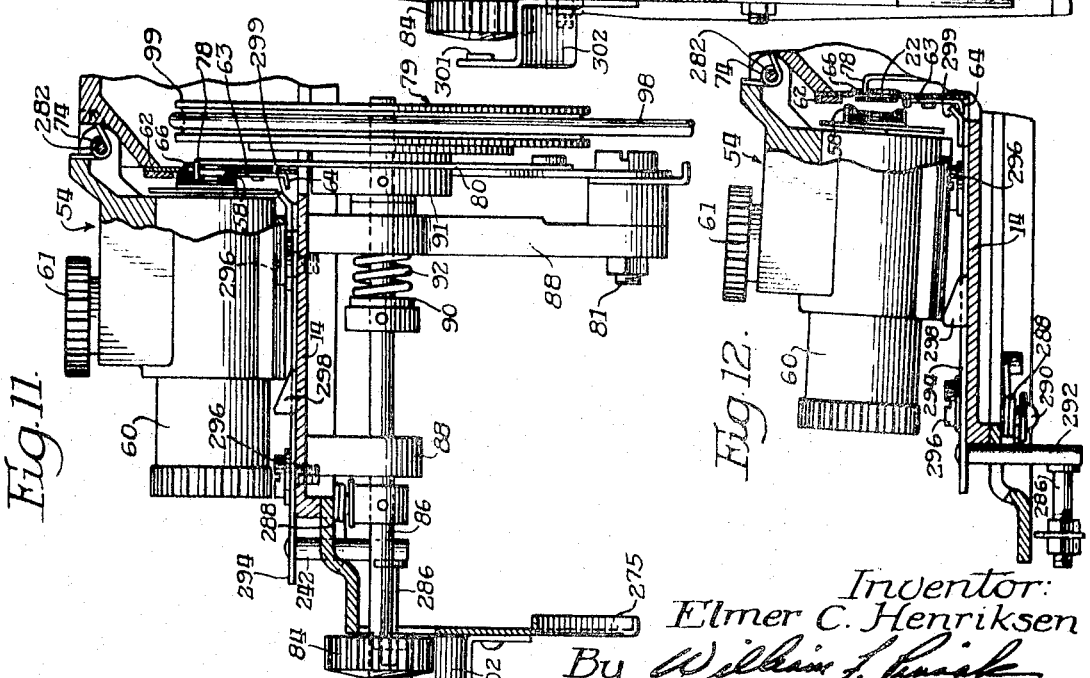

PROJECTOR FOR AUTOMATICALLY THREADING, REWINDING, AND INDEXING A PLURALITY OF FILM SPOOLS AND A MAGAZINE

This is a continuation of application, Ser. No. 439,210, filed Mar. 12, 1965 now abandoned.

The invention relates to a multiple-septum magazine and to a projector with which the magazine is usable. Particularly, the magazine is adapted to support several reels of film to enable sequential projection of the films with minimum attention by the operator. The projector includes an automatic control and rewind feature further enabling the sequential projection of a plurality of reels of film.

The known projectors, even those of the automatic-threading variety, are usually constructed such that following projection of a single film, one or more manual steps must be performed prior to rewinding of the film onto the supply reel. Specifically, when a film has been projected, the operator must clear the film from the guide path, rewind the film onto the supply reel, remove that reel, and replace it with a new reel of film. Thus, several manipulative steps must be performed by the operator between the projection of two reels of film.

Other problems which must be overcome to have a successful multiple-septum magazine-accepting projector include feeding the respective films from the magazine at the desired time, and once the film is projected, rewinding it upon the supply reel, and indexing the magazine to present a new film for projection. To rewind the film onto the supply reel in the shortest possible time requires high-speed movement of the film. Normally, without clearing the film from the film path used for normal forward projection, this cannot be accomplished because of the drag developed by the film moving between the film gate and the aperture plate, the drag caused by the side guides and the presence of the shuttle tooth in the film path. Ordinarily, the shuttle tooth must be moved at an equally rapid rate to prevent damaging the film due to tearing of the sprocket holes therein.

The present invention attempts to solve these several problems by providing a magazine in which a plurality of reels of motion-picture film may be supported relative to a projector capable of sequentially projecting the films. Particularly the magazine incorporates means to permit it to be indexed relative to the projector. It also includes a provision enabling a drive means of the projector to cause the film to be fed through a guide path to the projection area of the projector and subsequently to a takeup means.

The projector construction permits automatic rewind of the film after the film path has been cleared to enable relatively free movement of the film therethrough. Film-actuated sensors condition the projector for the sequences necessary to automatically control the film movement from threading through rewind. This projector includes a novel magazine-indexing mechanism which includes a provision which, after a length of film has been projected, automatically indexes the magazine to enable projection of another film and to automatically actuate the projector to project that film. Throughout the projection and rewind sequences relating to a particular film, an end of that film is retained on the supply reel by a novel shock-absorbing unit.

An object of the invention is to provide a novel magazine to support a plurality of webs of flexible, elongated material for sequential handling.

Another object of the present invention is to provide a multiple-septum magazine for holding a plurality of reels of motion-picture film for sequential handling, the magazine including means to permit indexing of same relative to the projector.

Still another object of the present invention is to provide a magazine having a plurality of chambers therein for maintaining a plurality of film within the magazine in spaced relation one to another and being provided with mechanisms to permit indexing such that each of the reels of film will be sequentially projected.

Yet another object of the present invention is to provide a motion-picture projector on which a magazine containing a plurality of motion-picture films is selectively positioned and each film automatically fed into the machine, projected, and rewound.

An additional object of the present invention is to provide a motion-picture projector having a mechanism to automatically condition the projector for rewind of the motion-picture film.

A still additional object of the present invention is to provide a novel mechanism for use with a magazine wherein the film is returned to the magazine upon completion of the projection of a length thereof.

Another additional object is to provide a motion-picture projector with a novel mechanism to clear the normal film path thereof of normally interfering mechanisms enabling the film to be moved freely along the path.

A still further object is to provide a motion-picture projector with a magazine-supporting portion over which a magazine may be indexed relative to a film entrance path of the projector to permit the respective films in the magazine to be threaded into the projector.

Another further object is to provide a motion-picture projector which cooperates with a magazine and includes means to sequentially project a length of film supplied in the magazine, means to rewind the projected film, and means to index the magazine when the length of the projected film is returned to the magazine.

A yet further object is to provide a novel shock-absorbing unit for a supply reel wherein film breakage is reduced to a minimum.

Other objects, features, and advantages of the present invention will become apparent from the following detailed description of certain preferred embodiments thereof taken in conjunction with the accompanying drawings in which:

FIG. 1 is an elevational view of the projector and a magazine supported thereon incorporating the present novel concept;

FIG. 2 is a view taken along section line 2—2 of FIG. 1 disclosing the magazine and indexing mechanism in more detail;

FIG. 3 is a section view taken along line 3—3 of FIG. 2;

FIG. 4 is a detailed view of a cross section of the magazine;

FIG. 5 is a view taken along section line 5—5 of FIG. 4;

FIG. 6 is a detailed view taken along line 6—6 of FIG. 1;

FIG. 7 is an enlarged perspective view of supply reel including a shock-absorbing unit for use with the projector;

FIG. 8 is an exploded perspective view of the shock-absorbing unit and film as disclosed in FIG. 7;

FIG. 10 is a view taken along line 10—10 of FIG. 9;

FIG. 11 is a view taken along line 11—11 of FIG. 9 with the machine in operating condition;

FIG. 12 is a view taken along line 12—12 with the machine in rewind condition; and FIG. 13 is a schematic diagram disclosing the operating circuitry of the present projector.

Figure 9:
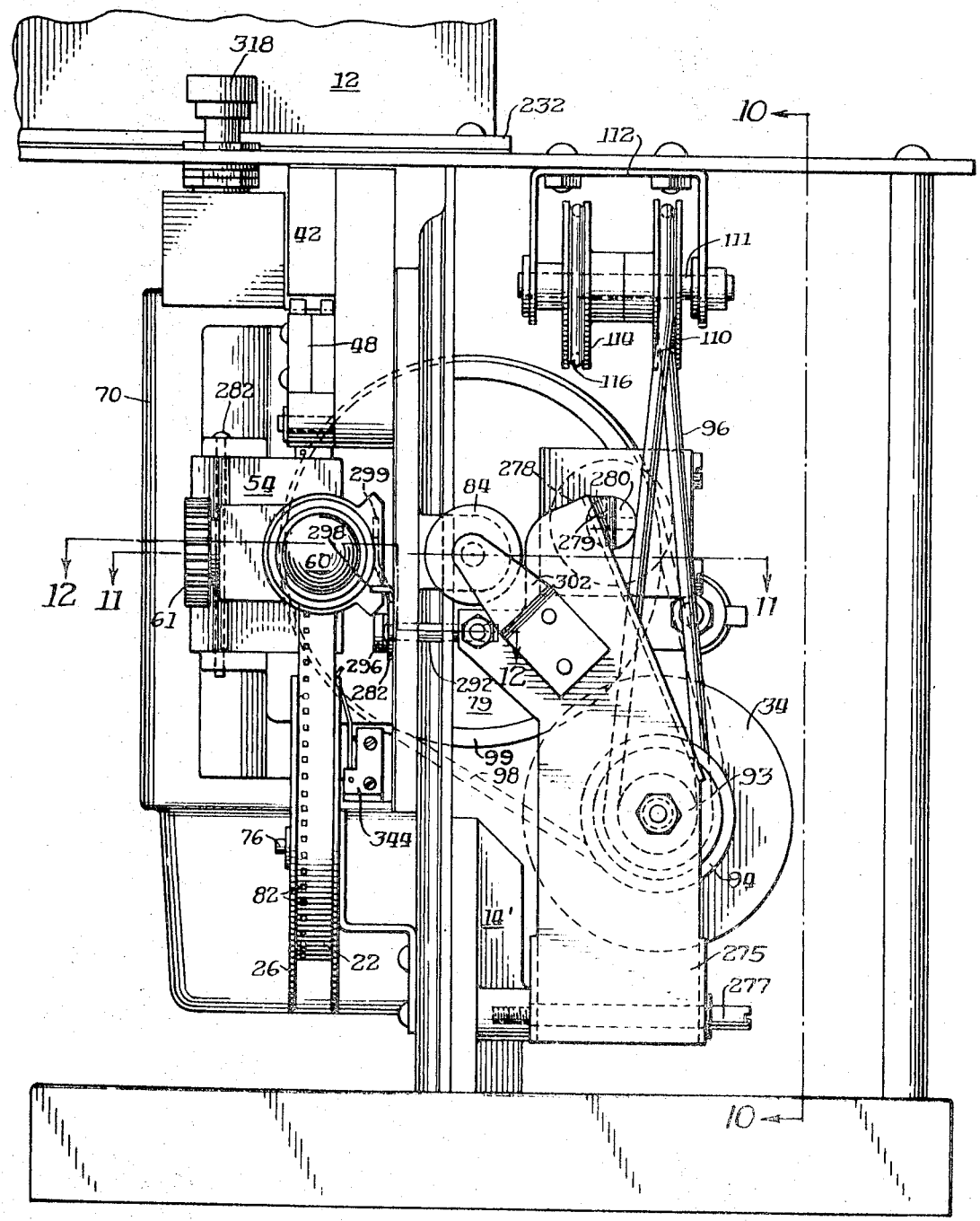
FIG. 9 is a view of the mechanism of the present invention as applied to the projector.

In FIG. 1 is disclosed an automatic threading-type projector 10 on which film supply means, herein shown as a magazine 12, is mounted in operating position. The projector 10 has a housing 14 including mechanism support portion 14' to which various mechanism components are mounted. A portion of housing 14 is formed as a support section 18, such as a substantially planar plate, relative to which the magazine 12 is positioned to be moved. A film entrance slot 20 is located in the plate 18 such that a film 22 may be fed from the magazine into a film-handling mechanism 24 and onto means for taking up film such as a takeup reel 26. The film-handling mechanism 24, generally located in the projection area, is driven by a motive means such as motor 34 in a conventional manner. Certain components of the film-handling mechanism are located adjacent to or normally in a film guide path 36 through the projector. The reel is supported on the projector housing 14, for taking up film in a conventional manner following passage through path 36.

As the film 22 passes through film entrance slot 20 in plate 18, it enters the upper portion of the film path 36 passing between a pair of channel members 40, 42, one of which is pivoted to move about an axis 44. The channel members have opposing modified S mating surfaces. Adjacent the pivoted channel member 42, so as to be actuated thereby, is located a normally open-type microswitch or sensor 48 having a contact member 50 formed as a biasing spring to urge the pivoted channel member into its normal position. The sensor 48 is responsive to the tautness of film in film path 36 and is connected in the operating circuitry of the projector to determine completion of projection of the film and to condition other portions of the circuitry to initiate a rewind sequence of the film. The activation of the sensor 48 occurs when the film becomes taut in the film path and acquires a linear configuration bearing against the movable channel member so as to move same. This tautness is caused when substantially a full length of film on film supply means herein shown as a supply reel 52 to which an end 22a of the film is maintained, has been projected and the film-handling mechanism 24 continues to attempt to feed the film through the film path 36.

Below the channel formed by members 40, 42 is positioned the lens carriage-film gate support 54 including a pressure plate 58 and a projection lens 60. A conventional lens-focusing knob 61 extends from support 54. To one side of the pressure plate is positioned a fixed side guide 62 which normally engages the film 22. (See FIGS. 11 and 12.) Adjacent the opposing film edge is located a movable side guide 63, which is urged into engagement with the film edge by conventional means. Accordingly, when normally disposed, guide 63 together with guide 62 comprise means defining a portion of path 36. An inclined flange 64 is formed along the edge of guide 63 remote from the film. Means comprising pressure plate 58 together with an aperture plate 66 defines a portion of path 36 behind lens 60 across the optical axis. Said pressure plate bears against one face of the film for maintaining the other face of the film against said aperture plate through which the light from a conventional lamp (not shown), located in lamp-housing portion 70, will project the image carried by film 22 onto a screen (not shown) in a conventional manner. A resilient member 74, such as a coiled spring, is mounted in an operative manner to urge the lens carriage-film gate support 54 into a position aligned on the projection axis of lens 60 with the pressure plate 58 against the film 22, substantially as shown in FIG. 11.

From the projection area 24, the film is subsequently fed to the takeup reel 26 onto which it may be threaded either manually or automatically. The reel is mounted in a substantially conventional manner on a spindle 76 supported on housing 14 and may be driven from motor 34 in a conventional manner.

Means for intermittently moving film 22 through the film path in the projector comprises a shuttle drive 80 having a film-engaging component such as shuttle tooth 78 for effecting film movement during projection. The drive is supported remotely from the tooth for pivoting action about an axis 81 through a mechanism plate 14'. The shuttle tooth is normally cyclically movable into film path 36 to engage sprocket holes 82 in the film. The shuttle tooth, a shutter 79 and other components of film drive mechanism 24 are synchronously operated by drive motor 34.

A manual advance wheel 84 is mounted on a rotatable shaft 86 to permit manual operation of the shutter 79 and of the shuttle tooth 78 in a conventional manner. (See FIG. 10) The shaft 86 extends through mechanism-mounting lugs 88, 88 formed with housing 14. Between a stop portion 90 attached to the shaft and one of the lugs 88 is positioned a coiled spring 92 to urge the shaft exteriorly of the machine. The shuttle drive 80 is mounted to be moved by a shuttle control cam 91 fixed to shaft 86. Longitudinal movement of the shaft causes similar movement of the shuttle tooth relative to the film path 36. Thus, the tooth is held out of engagement with the film, when the shaft is held against the biasing of spring 92.

The reversible motor 34 is provided with transmission means which may be in the form of pulleys 93, 94. The transmission pulleys are connected to drive various machine components by belts 96, 98 which respectively ride in the V-grooves of the pulleys 93, 94. A shaft 100 of the motor 34 extends both forwardly and rearwardly of the motor body. The rearward portion 100' terminates as a fan support shaft in the cooling-fan housing 101. The belt 98 on pulley 94 transmits motion to a pulley 99, formed as a rim for shutter 79, thus driving the shutter, shuttle drive 80 and other driven elements operably connected to shaft 86.

On the front end of motor shaft 100 is fixed a clutch member 102 having a friction face 103. An end flange 104 of the drive pulley 93 cooperates as the other clutch surface when the pulley is moved on the end of shaft 100 and the clutch surfaces engaged. The drive pulley 93 is mounted on drive shaft 100 such that the clutch surfaces are normally loosely engaged so that although pulley 93 is not positively driven, it is rotatable with shaft 100. Belt 96 is entrained around pulley 93 and another pulley 110 to transmit rotation thereto. Pulley 110 is fixed to a shaft 111 which is supported in a bracket 112 fixed to the housing. A similar pulley 114 is mounted spaced from pulley 110 along the shaft 111 to transmit the drive through a belt 116 for driving a dual-rimmed driver roller 120 which comprises means for transferring film into and returning film from path 36 from and to the film supply means.

Driver roller 120 is mounted on a shaft 122 which is rotatably supported in a pivoted arm 124. The end of shaft 122 opposite the driver roller has a pulley 126 fixed thereto. About the pulley is looped the other end of belt 116. The arm 124 is mounted to pivot on a shaft 128 supported on a bracket 130, which is preferably attached to the support plate 18. The end of the arm 124 remote from the driver roller support shaft 122 is attached through a resilient connection 133 to a movable member 134 of a solenoid or other operator 136 mounted on the housing 14. A stop 138 is adjustably mounted on the housing to limit the movement of the arm 124 when solenoid 136 is inoperative.

Movably positioned atop support plate 18 is a preferred embodiment of the magazine 12 in operating position. This multifilm magazine, as seen more particularly in FIGS. 2–6, comprises a housing which is formed of a molded support or bottom section 140 and a closure or top section 142, which may be formed in a like manner. These sections are joined together along one longitudinal surface by hinge structure 146. The sections are retained together when closed by a latch structure, e.g. a spring member 152 (See FIGS. 1 and 2) attached to one section so as to readily snap into and out of a cooperating notch 158 in the other section for each latching and unlatching.

An interior surface 160 of the support section 140 is substantially semicircular and has a plurality of relieved portions or grooves 162 spaced apart sufficiently to permit a pair of reel flanges 52a, 52b of adjacent supply reels 52, 52 to seat in the groove without their adjacent surfaces engaging one another. Between each pair of grooves 162 is an unrelieved portion 168 which is of a width a little less than the width of the film 22 to be contained on the respective reels in the magazine. The depth of the groove relative to the unrelieved portions is sufficient to prevent shifting of the reels longitudinally in the multireel magazine, but slightly less than the diameter of a "full" roll of motion picture film, e.g. as usually returned from the processor.

The interior surface 160a of the closure section 142 is preferably similarly grooved to form a substantially complete bearing and protective surface for the reels of film therein. A plurality of grooves 162a are aligned with the grooves 162 of the support section 140, as the unrelieved portions 168a are aligned with the other unrelieved portions 168. It will be readily seen that substantially half of each groove adjacent an unrelieved portion and that unrelieved portion form a chamber or septum 169 for a reel of film.

Extending longitudinally of the magazine 12 is a rod 170 having a reduced tapered end 172 and a knob 174 fixedly secured to the end opposite the tapered end. The rod 170 is supported in a pair of semicircular bearing surfaces 176, 176a in each of a pair of end plates 178, 178a of support section 140. In the other end plates 180, 180a of closure section 142 are formed similar semicircular bearing surfaces 182, 182a to retain the rod, and the reels 52 positioned thereon, in position when the magazine is closed. The rod passes through the conventional spindle opening 183 in each reel 52. The cooperating plates 178, 180, 178a, and 180a form respective end walls of the magazine.

In one end plate, such as 178a of support section 140 is formed a magazine-moving member receiving slot 185 of complementary shape to an end portion 186 of a magazine moving member 188. This magazine moving member is an elongated normally coiled noncumulative force-type spring. The other end is wound about a rotatable core 189 supported on an upright rod 190. The rod is fixed in the magazine support plate 18. The spring is unwound from about core 189 and a torque created therein when the end portion 186 is engaged in slot 185 of the magazine and the magazine is moved. The torque of the spring is subsequently employed to urge the magazine in the reverse direction to position the respective loaded chambers 169 relative to the film entrance slot 20 in support plate 18.

As seen in FIG. 7, the reel 52 has been provided with a shock-absorbing film clip unit 202 detailed in FIG. 8. The end 22a of the film 22 is held securely thereby to resist the pull on the film of the film-moving mechanism 24 and the takeup reel 26 of the projector. The supply reel 52 is formed with flanges 52a, 52b surrounding a hub 204 through which is formed spindle opening 183. The hub is usually formed with spokes 205 dividing the hub into segments. Axial access through at least one such segment is unrestricted to permit manipulation of the end of the film after it is fed through a slot 207 substantially in the center of that segment of the hub. The film end portion 22a is folded about an end of a shock absorber 209 formed of a deformable material, such as a piece of flat spring steel. A small hole 210 is formed near that end of the spring. The spring is approximately the width of the film and of a length slightly less than a chord of the hub interior. The chord is taken between junctures of adjacent spokes 205 with the hub interior. A small clip 211 is snapped over the folded film and the spring. The clip has a tang 212 bent therefrom adjacent one end thereof. A hole 213, cooperating with the tang is located adjacent the other end of the clip. The holes 210 and 213 are aligned such that tang 212 passes through the two layers of film and through the respective holes 210 and 213. The unit 202 is now inserted in the hub segment with the film feeding through slot 207 to begin the first convolution of film about hub 204.

The film is thus positively held to reel 52 such that end 22a will not be pulled therefrom when the length of film on the reel has been unwound and projected. The shock-absorbing unit 202 reduces the sudden tension force of the film pull when the innermost convolution is unwound. The flat spring 209 permits a slight "give" to the film, when tensioned sufficiently to substantially avoid film breakage and to enable actuation of sensor means responsive to film tautness.

As seen in FIGS. 2 and 5, the support section 140 of magazine 12 has a substantially planar, lower exterior wall surface 192 provided with a rack 194, a driver access opening 196 and a film outlet slot 198. The rack portion 194 is comprised of a plurality of teeth 214 formed in the bottom of the support section. Each tooth 214 has a surface 214a extending perpendicular to the support surface 18 and a second surface 214b inclined relative to the support surface. Surfaces 214a and 214b are engaged by portions of an escapement mechanism 216 when the magazine is positioned to be indexed relative to the magazine support surface 18.

The driver access opening 196 in the bottom of the magazine is sized sufficiently larger than that portion of the split or dual-rimmed driver roller 120 which will enter therein through the bottom of support section 140 to engage the flanges of one of the reels 52. The peripheral surfaces of driver roller 120 are surrounded with tires 218, 218 of rubber or similar material, to effectively transmit the driving force to the reel and therefore to the film on the reel.

Across the bottom of the support section 140 and centrally of each chamber 169 is integrally formed with the section a rib 222. These ribs have an arcuate interior configuration which continues the semicircular configuration of the interior surface of the unrelieved portions 168.

The film outlet slot 198 is formed through the bottom of support section 140 as the terminal portion of a wedge area 226 through which the film 22 is guided between the interior of the magazine and the film entrance slot 20 of the projector. Tapered portions 199 are formed in the section 140 to form side aligning guides for the film being fed through each outlet slot 198. Outlet slot 198 as well as entrance slot 20 are sized to have a width and thickness slightly greater than the similar dimensions of the particular film for which the projector is designed.

Along at least one, but preferably both, longitudinal edges of the support section 140 of the magazine is located a flange 230. Each flange will pass under a holddown member 232 fixed on support plate 18 to maintain the magazine aligned on the projector.

The magazine indexing and film-feeding mechanism of the projector is positioned primarily below the magazine support plate 18, but with some elements thereof extending through and above the plate surface. As seen in FIG. 2, the indexing mechanism includes an escapement mechanism 216 having a pair of stop portions 242, 243 extending from a body 244 which is pivoted about an axis through a pivot shaft 248. The escapement is actuated to pivot, in part, by a solenoid 250 and in part, by completion of the septum advance of the magazine. A rod 252 is fixed to the longitudinally movable solenoid plunger 256 to be moved therewith. The rod is connected to an arm 258 of the escapement body 244. Energization of solenoid 250 is controlled, in part, by the circuit making and breaking action of a film presence closing sensor or microswitch 260 (Note FIG. 6) and a rack tooth presence closing sensor or microswitch 262 to cause indexing of the magazine when a projected film has been returned thereto.

As seen in FIG. 2, the escapement mechanism 216 is normally pivoted such that the magazine is biased against stop portion 243. When the solenoid 250 is actuated, the mechanism pivots about axis 248 releasing the affected magazine rack tooth 214 and stopping the preceding one with stop portion 242. Return of the solenoid to normal allows slight movement of the magazine to locate a rack tooth following the first for engagement by the stop portion 243.

As seen in FIGS. 9 and 10, an actuator plate 275, which comprises means for opening the path 36 and preventing film engagement by shuttle 80 during film transfer into and return from said path, is pivotally mounted to move about a shaft 277 mounted in a mechanism plate 14' of housing 14. The pivoting action of the actuator plate is controlled by a solenoid 278 mounted in another portion of housing 14. The moving member 280 of the solenoid 278 is attached to the plate through an angled portion 279 extending from the plate such that when the solenoid is actuated, the plate will be urged rearwardly of the projector. (FIG. 9 being a front view.) The motion of the plate will actuate several mechanisms of the projector to condition the projector for initial projector threading from, and fast film rewind onto, the appropriate supply reel 152 in the magazine 12.

Movement of the actuator plate 275 is transmitted to move the aperture gate 58 away from film 22 by pivoting of the lens carriage-film gate support 54 about a hinge pin 282. This movement of the support 54 away from the adjacent housing 14 is against the biasing of the spring member 74. As seen in FIGS. 9-12 the plate 275 is connected to an adjustable-headed abutment member 286. This abutment member and therefore the parts attached thereto, are biased forwardly of the projector by a rockable coil spring 288 mounted about a fixed stud 290. The abutment member is positioned to engage an arm 292 fixedly mounted in a support moving plate 294. This plate is slidable on headed pins 296, 296 mounted in a portion of housing 14, and extending through slots 297, 297 in plate 294. On the slidable plate is a wedge member 298 which will move the support 54 to an open condition against the urging of spring member 74 when the plate 275 is pulled rearwardly of the projector by solenoid 278.

Simultaneously with the actuation of the wedge member 298 and the resulting clearing of the adjacent portion of film path 36, a contact button 301 on an arm portion 302 of the actuator plate 275 engages the forward portion of the manual advance wheel 84 which is locked to shuttle support shaft 86. As the arm portion 302 moves the shaft 86, the shuttle tooth is caused to be moved clear of the film path 36 (as disclosed in FIG. 12) when solenoid 278 is energized. This eliminates the necessity for having to actuate the shuttle tooth in timing with the more rapid movement of the film in fast rewind or the removing of the film from film path 36.

The film path 36 is simultaneously widened in the area of the side guides 62, 63 as the support moving plate 294 is moved. A pusher 299 extending from the plate engages the flange 64 of the side guide 63 to move it from its normal operating position to an outward position spaced from the side of the film, as seen in FIG. 12. Thus, the drag on the film edge, which is normally associated with keeping it aligned in the film gate, is effectively eliminated.

As seen in FIG. 10, a threaded stud 310 is adjustably mounted in a portion of plate 275. Movement of the plate thus causes the stud to engage the cone cover 316 integral with the movable clutch or reversing pulley portion 93 to longitudinally move the pulley into frictional engagement with the clutch portion 102 which is fixed to shaft 100. Thus, the pulley is driven by the motor at a high speed attained by the more positive drive and because the motor is under a relatively small load in rewind as compared to the much larger load required to move the film in the closed film path. Energization of solenoid 278 occurs primarily when the film tautness or projection completion sensor 48 has been actuated.

Disclosed in FIG. 13 is an exemplary circuit for the instant projector in which a magazine presence-detecting sensor 312 is located in the main power supply to enable the projector to be operated only when a magazine 12 is present on support plate 18. This sensor is preferably located on the projector adjacent the sensor 262 to be engaged by a portion of the magazine bottom 192 adjacent the rack 194. The sensor is actuated to enable operation of the projector as long as the magazine is operatively positioned thereon. If the projector designed for single-reel use, a conventional control switch would be substituted for sensor 312.

The control of the projector is initiated by temporarily depressing a forward control button 318. This button is operably connected to actuate forward relay 322 which controls several contacts, which are preferably of the double-pole, single-throw type. A similar reverse control button 325 is connected to actuate similar contacts through a reverse relay 328. The control magnets of the relays are electrically interlocked through contacts 334, 338 such that only one relay may be operated at a time. Pressing of the forward button 318 closes the circuit through the forward relay 322 to move the several contacts from their disclosed "off" positions to their respective "on" positions. The connecting circuit through the normally "off" position of the reverse button 325 and contacts 332, is completed to form a holding circuit to maintain the forward relay closed until the circuit is eventually broken by the actuation of the completion of projection sensor 48 or the actuation of the reverse button 325 to its "on" position.

Contacts 340 of the forward relay 322 complete the circuit to energize the motor 34. Contacts 342 energize solenoid 278 and solenoid 134. These solenoids are in circuit as film is fed past the projection area and the forward solenoid release sensor 344 is actuated thereby. Interruption of the circuit through the solenoids terminates the reel-driving engagement of the driver 120 and simultaneously permits shuttle tooth 78 and the other elements actuated by the movement of plate 275 to return to their normal operating condition. The projector now operates to feed film in a conventional manner until substantially the entire roll has been projected.

The automatic control circuitry through the projector remains unchanged until the completion of projection sensor 48 is operated to cause energization of the reverse relay 328 and a rewind relay 346, simultaneously releasing the forward relay 322 by breaking the holding circuit through the reverse button 325. The reverse relay is placed in a holding circuit between contacts 338 of forward relay 322, the circuit through forward button 318, and holding contacts 354 of the reverse relay 328. Solenoid 134 is actuated through the completion of the necessary circuit through contacts 356. These contacts have also energized the reel advance switch sensor 260. Simultaneously, contacts 358 are closed to cause the direction of operation of motor 34 to be reversed. Forward relay 322 cannot now be actuated due to the interlock established through contacts 334 and the open circuit through reverse button 325.

As indicated, the rewind relay 346 is simultaneously operated when sensor 48 is actuated. This relay is held closed by a holding circuit energized by completion of the interlock circuit through contacts 334 and holding contacts 362. Through the circuit now established by contacts 364, solenoid 278 is actuated. The reel advance solenoid 250 is energized until the film is rewound past sensor 260, to release it and thus indicate the completion of the rewind portion of the cycle. This activation of sensor 260 by absence of film now breaks the holding circuits of relays 328 and 346 as the film returns to the magazine. However, the rewind and reverse circuits are maintained until indexing of the magazine causes rack tooth 214 to actuate sensor 262. The escapement mechanism 216 has been activated by the actuation of the solenoid 250, which was energized by completion of the circuit through contacts 370 of the rewind relay and the closing of sensor 260, to now permit spring 188 to urge the magazine to position the next septum thereof for a forward projection cycle. This indexing movement of the magazine now causes the tooth 214 to close the circuit through sensor 262 to automatically actuate forward relay 322 to initiate repetition of the previously described cycle.

If the projector operator desires to operate the projector in normal speed reverse, such is accomplished by depressing the reverse control button 325. Thus, the reverse relay 328 is energized and placed in a holding circuit by completing the circuit through contacts 354 and the forward button 318. Since reverse relay 328 is operated, motor 34 is energized through contacts 358 for reverse operation. The reel drive solenoid 134 has been simultaneously energized through contacts 356 to cause raising of the driver roller 120 to drive the reel 164 in a rewind direction. The circuit through solenoid 278 remains open to maintain film path 36 in its closed condition with clutch faces 103, 104 not positively engaged, as when direct drive is desired. The reverse operation is therefore carried out at a normal speed.

Loading of the magazine requires that the operator align and place the desired number of reels of film in the chambers 169 of the magazine, beginning with the septum adjacent the leading end of the magazine, as it is moved over the projector. The top of the magazine is closed and latched. The magazine is then located on the support plate 18 of the projector 10 between the guides 232, 232 and is manually or otherwise moved across the support plate, tensioning the spring 188, until the last-filled septum is substantially aligned over the film path entrance slot 20 of the projector. The necessary number of rack teeth 214 on the magazine have been moved beyond the escapement mechanism 216. The surface 214a of the last of the teeth to pass the mechanism becomes engaged with it to hold the magazine in position for the film in the aligned chamber to be fed into the projector.

Operation of the projector is now initiated by actuation of forward button 318 which energizes forward relay 322. Through the contacts of this relay, the motor 34 is energized to drive the required elements of the projector. Solenoid 134 is likewise energized to cause the elevation of driver roller 120 into engagement with the loaded reel 164 to drivably rotate that reel in a clockwise direction. Because the solenoid 278 is actuated, the film path is cleared and the clutch faces 103, 104 are frictionally engaged so that the driver roller 120 is operated at a high speed. Thus, by the centrifugal force generated, the end of film 22 is urged outwardly of the reel into and through the wedge area 226 to subsequently enter the film path 36 through entrance opening 20. The film is subsequently fed through the projection area 24 and onto the takeup reel 26. Immediately before reaching the takeup reel, the film has actuated the sensor 344 which determines that the threading sequence has been completed. The solenoids 134 and 278 are now deenergized and the projector operated in a substantially normal manner until the length of the film to be projected has passed through the projection area.

The end of the film 22 is locked to the reel 164 so as not to be pulled therefrom when the film has been fully projected. The pull of the film feed and takeup mechanisms will cause the film to be pulled taut in the film path. This will cause movable channel member 42 to actuate sensor 48 to indicate completion of the projection sequence. The circuit through sensor 48 will then condition the projector for fast rewind. This conditioning includes opening the film gate 54, retracting the shuttle tooth 78 from the film path 36, moving the side guide 63, and reversing the motor 34 which is operable at a high speed since it is positively clutched to drive the roller 120 for fast counterclockwise rotation of the reel 164 and is required only to move the film through a clear film path.

As the end of the film 22 clears the reel advance switch 260, and is finally wound on the reel 164 as the reel coasts to a stop, the reverse and rewind circuits are returned to normal and the projector is conditioned for another projection-rewind cycle to follow indexing of the magazine by the escapement mechanism actuator 250 as controlled by the circuit through sensor 262 which was opened by the movement thereover of one of the rack teeth 214 of the magazine as the escapement mechanism 216 releases the same to be moved by the biasing of spring 188.

If the previously projected film was in the last of the septums, the magazine clears the magazine presence sensor 312 and deenergizes the main projector circuit, automatically cutting off power to the machine until the operator positions another magazine with film therein on the projector.

Although the projector has been described as intended for use with multireel magazines, obviously, portions of it may be adapted for use as an automatic rewinding projector for reels of film. Thus, the control circuitry for detecting and causing indexing of the magazine can be eliminated as unnecessary. The projector will then operate to project film and return the projected film to the reel without the attention of the operator.

It is to be understood that modifications and variations may be effected without departing from the scope of the novel concepts of the present invention.

What is claimed is:

1. A magazine adapted to be used with a motion-picture projector having an indexing mechanism, said magazine being adapted to contain a plurality of supply reels of film, the magazine including:
    film exit means;
    means adjacent the periphery of said supply reels to permit feeding of an end of said film from and to said magazine through said film exit means; and
    indexing means on said magazine to permit movement of said magazine by the indexing mechanism on said projector when substantially the full length of said elongated film has been fed from said magazine and that length returned thereto.

2. A magazine adapted to contain a plurality of supply reels of film and to be used with a motion-picture projector having film drive means and indexing mechanism, said magazine including:
    a housing;
    film exit means aligned in said housing;
    film access means aligned in said housing adjacent the periphery of said supply reels through which said film drive means may extend to permit driving of said film to cause feeding of an end of said film from and to said magazine through said film exit means; and
    indexing means aligned on the exterior of said magazine to permit movement of said magazine housing by the indexing mechanism on said projector to align another of said film exit means and another of said film access means for film feeding when substantially the full length of film on one of said supply reels of film has been fed from said magazine and the length returned thereto.

3. A magazine for at least partially enclosing a plurality of elongated flexible webs, said magazine being adapted for use with a web handling machine have an indexing means and a web-accepting opening, the magazine comprising:
    a housing having means therein dividing said housing into a plurality of chambers;
    each said chamber being adapted to contain a web;
    a plurality of longitudinally aligned openings in said housing adjacent each of said chambers; each of said openings being of a dimension slightly greater than the width and thickness dimensions of said elongated web to permit said web to be selectively passed therethrough into said web handling machine; and
    means exterior of each said chamber adapted to be engaged by the indexing means of said machine to permit chamber by chamber movement of said magazine to align said openings in said housing selectively with the web-accepting opening in the machine.

4. A magazine for substantially enclosing a plurality of webs, said magazine being usable with a flexible web-handling machine having an indexing means thereon, the magazine comprising:
    a housing having means therein effectively dividing said housing into a plurality of chambers;
    each said chamber being adapted to contain an elongated web;
    a plurality of openings in said housing of dimensions slightly greater than the width and thickness dimensions of said elongated web, through which said web may be passed;
    each of said openings being substantially aligned with a chamber in said housing; and
    means on said housing exterior of each said chamber adapted to be engaged by the indexing means of the web handling machine to permit chamber by chamber movement of said magazine relative to said machine.

5. A magazine as in claim 4, wherein said housing is elongated and includes a pair of end means; and
    support means extending between said end means to support a web in each said chamber.

6. A magazine as in claim 4, wherein said housing includes a removable means to support a web substantially concentrically in each said chamber.

7. A magazine adapted to contain a plurality of elongated films and to be used with a motion-picture projector having film drive means and indexing mechanism, said magazine including:
    film exit means adjacent to which an end of each of said elongated films is located;
    film access means through which said film drive means may be moved to feed said end of said film from and to said magazine through said film exit means;
    means intermediate said film access means for guiding said film to said film exit means; and indexing means on said magazine to permit movement of said magazine by the indexing mechanism on said projector when substantially the full length of said elongated film has been fed from said magazine and that length returned thereto.

8. A magazine for at least partially enclosing a plurality of elongated flexible webs, said magazine being adapted for use with a web-handling machine have an indexing means and a web-accepting opening, the invention comprising:
a housing;
means dividing said housing into a plurality of chambers;
each of said chamber being adapted to contain a web;
exit means in said housing adjacent each of said chamber;
each of said exit means being of a dimension slightly greater than the width and thickness dimensions of said elongated web to permit an end of said web to be selectively passed therethrough into and from said web-handling machine; and
means exterior said housing to be engaged by the indexing means of said machine to move said magazine to align said exit means in said housing selectively with the opening in the machine when the web is returned to the magazine.

9. A magazine for substantially enclosing a plurality of convolutionally wound elongated webs, said magazine being adapted for use with a machine for handling such elongated webs, said machine including an indexing means, the magazine comprising:
a housing;
means dividing said housing into a plurality of chambers;
each chamber being adapted to house an elongated web;
a plurality of spaced slots in said housing, one of said slots being substantially aligned with each said chamber;
said slots being dimensioned slightly greater than the width and thickness dimensions of the elongated web; and
a plurality of rack means on the exterior of said housing;
one of said rack means being substantially aligned with each said chamber;
whereby each said rack means is adapted to be engaged by the indexing means on the web-handling machine to move said magazine from one chamber to another relative to the machine.

10. A magazine for enclosing a plurality of elongated films mounted on flanged reels having an apertured hub therethrough, for use with a film projector having a powered drive roller and an indexing means permitting said magazine to be moved relative to a film entrance slot in said projector through which the film is fed to the projection area of the projector, said magazine comprising:
a pair of connected housing sections;
a pair of end plates forming at least a portion of each said section;
bearing portions in each said end plate;
shaft means for supporting a plurality of reels extending into each bearing portion;
groove means interior of at least one of said sections;
said groove means being spaced to maintain alignment of reels contained in said magazine;
film exit prevention rib portions in one of said sections aligned with said grooves;
an opening in said one section intermediate each said groove;
said opening being adapted to permit driving engagement of the flanges of the reel by the drive roller of the projector;
slot means in said one section perpendicular to said rib portions;
each said slot means being adapted to be aligned with the film entrance slot of said projector; and
a plurality of teeth along the exterior of said one section;
each said tooth being aligned with a groove in said section and being adapted to be engaged by the indexing means of said projector;
whereby said magazine is adapted to be indexed such that the film on each said reel may be fed through said slot means into said film entrance slot.

11. A magazine for enclosing a plurality of elongated films as in claim 10, wherein spaced interior portions of the said one magazine section are arcuately shaped, and one of said areas extending to said respective outlet slots is substantially wedge shaped to receive an end of a film and direct same to its respective slot means.

12. A magazine for enclosing a plurality of elongated films as in claim 10, wherein said projector includes a magazine biasing means urging said magazine in one direction, and wherein the exterior surface of said magazine has a notch adapted to be engaged by said magazine biasing means of the projector.

13. A magazine for enclosing a plurality of elongated films as in claim 10, wherein said projector includes a magazine support portion and a magazine guide means on said portion; one section of said magazine having a guide portion adapted to be engaged by said guide means on said projector to guide said magazine when the same is permitted to move on said support portion of said indexing means.

14. A magazine for enclosing a plurality of elongated films mounted on flanged reels for use with a film projector having a film drive means, a magazine biasing means urging said magazine in one direction, a magazine guide means, and an indexing means permitting said magazine to be stepped by said biasing means relative to a film entrance slot through which the film is fed to a projection area in the projector, said magazine comprising:
a housing formed of at least a pair of connected sections;
a plurality of spaced reel alignment maintaining grooves interior of at least one of said sections;
each said groove being of a dimension substantially equal to the dimension between the flanges of each of said reels;
an opening in said one section intermediate each said groove;
said opening being adapted to permit driving engagement of said reel flanges by the film drive means of said projector; 1
a plurality of outlet slots in said one section;
each of said slots being positioned adjacent an opening and being of a width and thickness greater than said film;
each said slot being adapted to be aligned with the film entrance slot in the projector;
a plurality of rack teeth on said one section;
each said tooth being aligned with a groove in said one section and adapted to be engaged by the indexing means of said projector;
a guide portion on said one section adapted to be engaged by said guide means of said projector; and
a notch exterior of said one section adapted to be engaged by said magazine biasing means of the projector whereby said magazine is adapted to be indexed in the direction as urged by said biasing means such that each of said films is fed through one of said outlet slots into said film entrance slots of the projector.

15. A magazine for a plurality of reels of motion-picture films and the like comprising:
a unitary housing having a plurality of aligned and inwardly extending septa defining a plurality of aligned reel chambers within said housing, said septa being proportioned for engagement between the flanges of a reel, said housing having film exit means for removing film from each of said chambers; and
means for indexing said housing for aligning successive reel chambers for film exit at an exit station.

16. A magazine as defined in claim 15 in which said housing has a plurality of grooves disposed between said septa, each groove proportioned for reception adjacent an adjoining septa of a reel flange from an adjoining pair of reels.